United States Patent [19]

Drabowitch

[11] 4,338,607
[45] Jul. 6, 1982

[54] CONICAL SCAN ANTENNA FOR TRACKING RADAR

[75] Inventor: Serge Drabowitch, Paris, France

[73] Assignee: Thomson-CSF, Paris, France

[21] Appl. No.: 104,837

[22] Filed: Dec. 18, 1979

[30] Foreign Application Priority Data

Dec. 22, 1978 [FR] France .................. 78 36245

[51] Int. Cl.³ .............. H01Q 3/18; H01Q 15/23
[52] U.S. Cl. ................... 343/754; 343/7.4; 343/761; 343/781 CA; 343/840
[58] Field of Search ............ 343/786, 759, 761, 7.4, 343/118, 754, 781, 839, 781 CA, 840

[56] References Cited

U.S. PATENT DOCUMENTS

| | | | |
|---|---|---|---|
| 2,422,579 | 6/1947 | McClellan | 343/754 |
| 2,991,473 | 7/1961 | Van Staaden | 343/839 |
| 3,226,721 | 12/1965 | Gould | 343/754 |
| 3,312,975 | 4/1967 | Huelskamp | 343/761 |
| 3,949,404 | 4/1976 | Green | 343/786 |
| 4,173,762 | 11/1979 | Thompson et al. | 343/759 |

FOREIGN PATENT DOCUMENTS 1261908  4/1960  France .
2261628  2/1974  France .

Primary Examiner—Eli Lieberman
Attorney, Agent, or Firm—Karl F. Ross

[57] ABSTRACT

Disclosed is a conically scanning antenna emitting a beam of radiation which is modulated in phase but not in amplitude. In certain embodiments the antenna comprises a source of radiation including a horn illuminating a reflector, the horn being either inclined to the reflector axis or juxtaposed with a prism imparting such inclination to its direction of maximum radiation. The inclined horn or the prism is rotated about the axis by drive means supplying a reference scanning signal to a processor.

9 Claims, 7 Drawing Figures

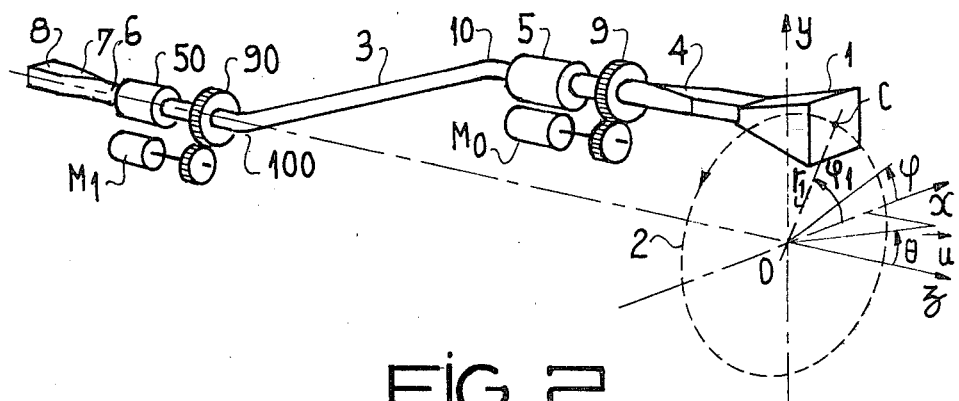
FIG_1
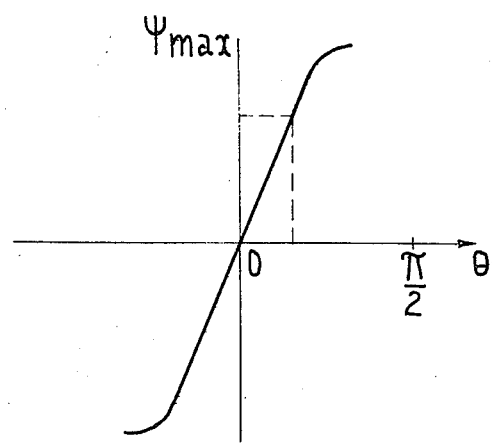
FIG_2
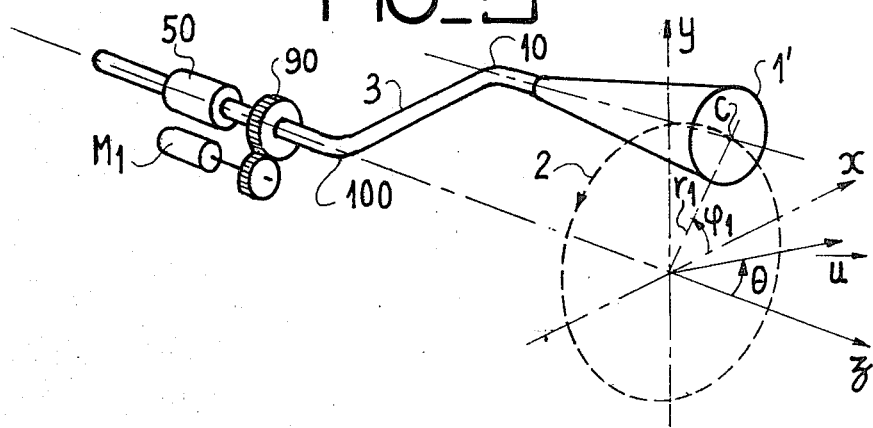
FIG_3

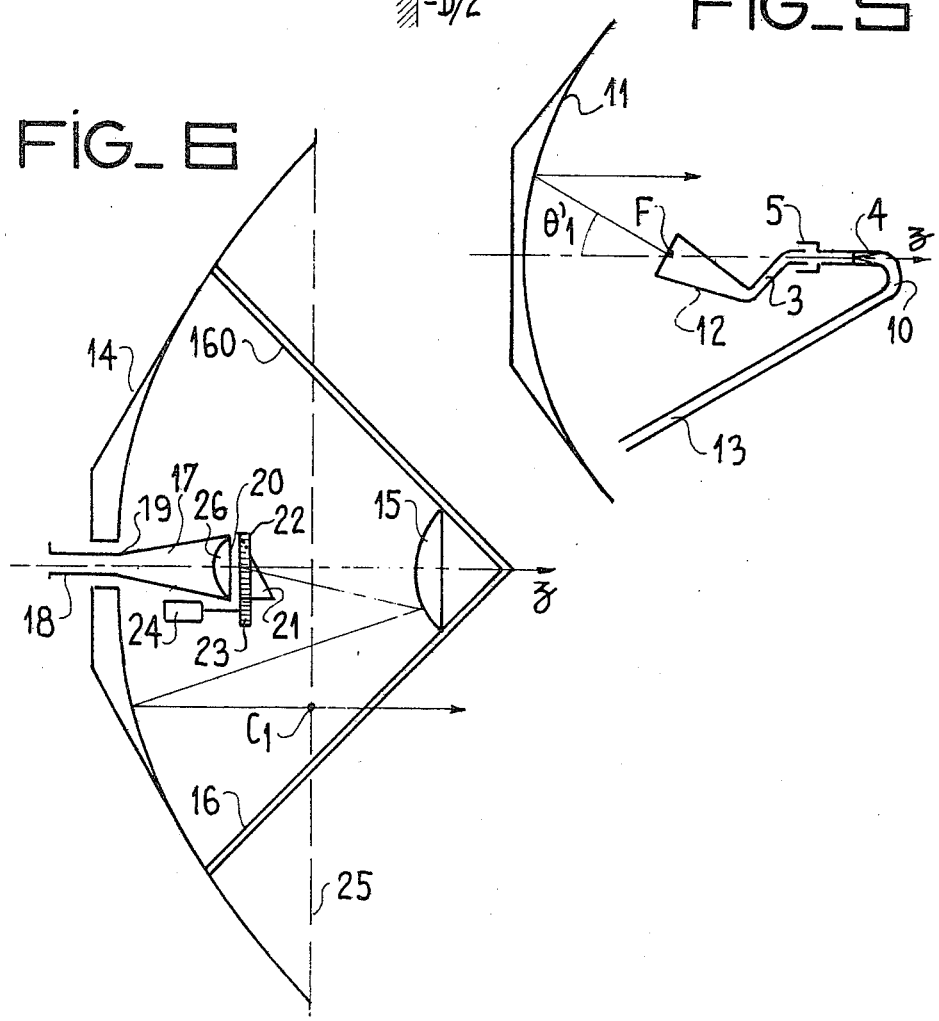

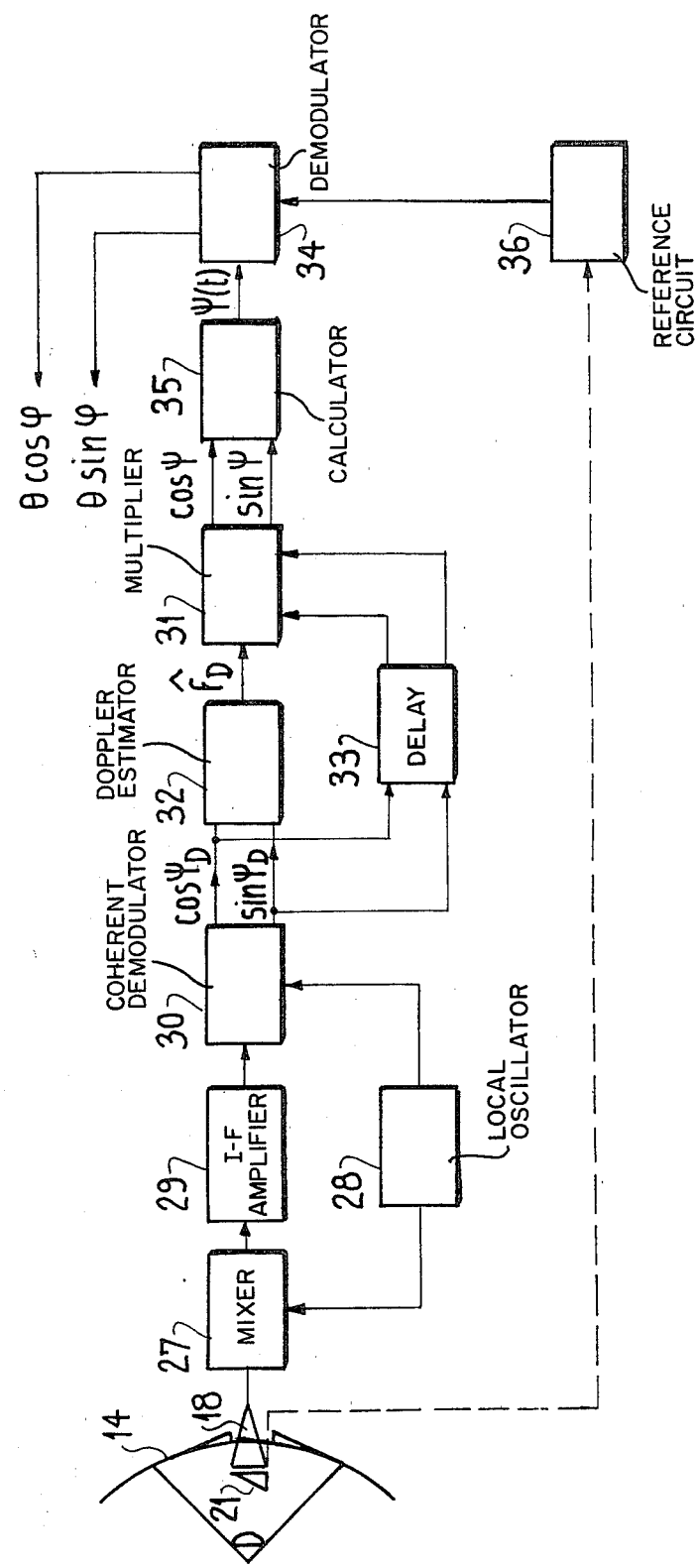
FIG_7

CONICAL SCAN ANTENNA FOR TRACKING RADAR

FIELD OF THE INVENTION

My present invention relates to a conically scanning antenna for a radar, especially a tracking radar.

BACKGROUND OF THE INVENTION

A tracking radar measures the coordinates of a target and supplies data which can be used for determining the path of the target and predicting its future position. To establish this prediction it is possible to use substantially all the data available in a radar, namely the distance, elevational angle, azimuth and Doppler frequency, so that a priori any radar can be looked upon as a tracking radar from the time when the output information which it supplies is processed in an adequate manner. However, a tracking radar differs from other radars by the way in which the angular tracking of the target takes place. This mode of tracking serves to generate an error signal indicating the angular deviation or squint of the target direction with respect to the axis of the antenna, referred to in the art as the boresight axis, this error signal being supplied to servomechanisms for realigning the antenna axis with the target direction.

In general, there are three standard methods of producing this error signal.

A first method is the detection of a target by sequential lobing, the second method is conical scanning, and the third method is the monopulse technique.

The antenna according to my invention uses the conical-scanning method, whose principle will now be described.

In a conical-scanning system having focusing means, the antenna is illuminated by a primary source and its phase center describes a circle of given radius located in the focal plane around the focal axis of the system. With such an antenna the radiation diagram is no longer centered on the axis of the focusing system but instead rotates in space in such a way that the maximum-radiation direction describes a cone whose vertex half angle is called the squint angle of the antenna. In the absence of focusing means, conical scanning can be obtained by a rotary source inclined with respect to its axis of revolution whose phase center is located on that axis.

The amplitude of the signal supplied by the antenna is thus modulated at the rotation frequency of the diagram and its modulation depth is a function of the angle between the target direction and the rotational axis. The modulation signal extracted from the echo signal is used in servomechanisms for locking the antenna position onto the target.

Owing to the symmetry of revolution, the beams radiated by the antenna all intersect along the axis of revolution and generally cross at a point chosen by way of compromise between the slope at the origin, determining the precision of pointing, and the range of the radar.

In a conventional conically scanning antenna the radiation diagram is the same on transmission and on reception; thus, by analyzing the diagram on transmission, it is possible to find the rotational frequency of the diagram for jamming purposes.

There are instances where this possibility of detecting the rotational frequency of the radiation diagram of the conically scanning antenna must be eliminated.

It has already been proposed to transmit in accordance with a radiation diagram centered on the axis of the antenna and to receive in accordance with a radiation diagram conforming to conical scanning. A construction based on this principle has a primary source of the monopulse type supplying signals in a sum channel and in two difference channels, one in azimuth and the other in elevation. The sum channel is combined with the difference channels and the conical-scan diagram is obtained on reception by a rotary variable phase shifter which varies the phase between the difference and sum signals. The radiation diagram obtained is eccentric and rotates at the velocity of the phase shifter. This arrangement defines a receiver with a single channel which is not, however, protected from errors with regard to the determination of the angles, due to fluctuations of the echo amplitude. Moreover, it involves relatively complex and consequently expensive structures.

OBJECT OF THE INVENTION

The object of my present invention is to provide an antenna affording the advantages of conical scanning without having the disadvantages of the prior systems.

SUMMARY OF THE INVENTION

A conically scanning antenna according to my present invention comprises a source of electromagnetic waves which, with the aid of wave-reflecting means centered on an axis, are converted into a beam of phase-modulated radiation with a direction of maximum radiation inclined to that axis at an acute angle. Upon rotation of this direction of maximum radiation about the axis, by drive means coupled with the source, a cone is generated whose vertex substantially coincides with a focal point of the wave-reflecting means; the phase center of the source, preferably, also coincides with that focal point. Azimuthal and elevational data relating to a target illuminated by the beam are extracted from reflected and intercepted waves by circuit means connected to the source. Such circuit means may include a generator of reference scanning signals coupled with the drive means.

The source may simply be a suitably inclined radiator, such as a horn, having a phase center substantially coinciding with the focal point of the wave-reflecting means. Pursuant to another feature of my invention, however, the source comprises a horn centered on the reflector axis and closely juxtaposed with a prism establishing the inclined direction of maximum radiation. Substantial coincidence of the phase center with the cone vertex and with the focal point can be achieved also in this case by means of a focusing lens confronting that prism.

BRIEF DESCRIPTION OF THE DRAWING

The above and other features of my invention will now be described in greater detail with reference to the accompanying drawing in which:

FIG. 1 is a diagrammatic perspective view of a conically scanning antenna with a frustopyramidal radiator;

FIG. 2 is a curve representing angular deviation of a function of phase displacement;

FIG. 3 is a view similar to that of FIG. 1, showing an antenna with a frustoconical radiator;

FIGS. 4 and 5 are diagrammatic views of a conically scanning antenna, with a reflector illuminated by a radiation source, according to my invention;

FIG. 6 is a diagrammatic view of a conically scanning Cassegrain antenna embodying my invention; and FIG. 7 is a block diagram of the means for processing the signals supplied by a conically scanning antenna according to my invention.

SPECIFIC DESCRIPTION

FIG. 1 shows a radiation source 1 orbiting around an axis z of a fixed reference frame x,y,z with origin O. The source is shown to be in the form of a horn whose phase center C describes a circle 2 in a plane perpendicular to the maximum-radiation direction of the source and thus of the antenna constituted by horn 1.

The following calculation shows how the transmitted signal can be modulated in phase.

The phase center C of source 1 is located by its polar coordinates $r_1$, $\phi_1$, with $\phi_1 = 2\pi Nt$, N being the rotational frequency of the horn. A vector $\vec{u}$ is defined by its spherical coordinates $\theta$ and $\phi$, i.e. angles in the yz and xz planes.

If $\vec{f_c(u)}$ or $\vec{f_c}(\theta,\phi)$ represents the diagram of the measured source with respect to its reference point C, the diagram with respect to the fixed point O is given, in accordance with the "translation theorem", by the equation $$\vec{f_o(u)} = \vec{f_c(u)} e^{ik \cdot \vec{OC} \cdot \vec{u}} \qquad (1)$$

where $i = \sqrt{-1}$ and k is the wave number equal to $2\pi/\lambda$, $\lambda$ being the wavelength used.

On making explicit the scalar product of the exponential term we obtain $$f_o(u) = f_o(\theta,\phi) = f_c(\theta,\phi) e^{ikr_1 \sin\theta \cos(2\pi Nt - \phi)} \qquad (2)$$

The diagram so transmitted has no amplitude modulation but has a phase modulation instead.

After reflection onto a target M located in the direction $u(\theta,\phi)$, a signal is received which is represented by a scalar product proportional to the square of the diagram, i.e. of form $$s(t) = A[f_c(\theta,\phi)]^2 e^{2ikr_1 \sin\theta \cos(2\pi Nt - \phi)} \qquad (3)$$

The equivalent echo surface of the target as well as other parameters, such as wavelength, distance and Doppler effect, are involved in the coefficient A. Thus, we obtain a signal having a phase modulation:

$$\psi(t) = \psi_{max} \cos(2\pi Nt - \phi) \qquad (4)$$

and the modulation depth is given by $$\psi_{max} = 2kr_1 \sin\theta \qquad (5)$$

On considering the S-shaped discrimination curve of FIG. 2 it can be seen that equation (5) gives the variation of the phase-modulation factor as a function of the angular deviation $\theta$ of the target. The phase modulation relative to the position of rotary source 1 directly gives the second coordinate $\phi$. The angular-deviation slope p, namely the slope of the discrimination curve of FIG. 2, is given by the main part of $\psi_{max}$, namely by $$p = 2kr_1 = 4\pi r_1/\lambda \qquad (6)$$

This part is proportional to the radius of the orbital circle measured in wavelengths and the higher it is the more sensitive and consequently the more precise is the system.

The frustopyramidal radiator of FIG. 1 is connected to a bent circular guide 3 by means of a rectangular/circular waveguide joint 4 and a rotary coupler 5. The other end of guide 3 is connected to a second rotary coupler 50 and to a circular guide 6 followed by a circular/rectangular guide joint 7 identical to joint 4. A rectangular waveguide 8 connects the system described hereinbefore to a conventional power supply not shown. Driving gears 9 and 90 are respectively mounted on the circular guide connecting joint 4 to coupler 5 and on the end of the bent circular guide 6 connected to coupler 50. The gears are driven by motors $M_o$ and $M_1$ which are synchronized but counterrotate in such a way that source 1 always remains parallel to itself in its orbital movement along circle 1. It should be noted that elbow 10 is so corrected that the insertion phase is made independent of the polarization.

FIG. 3 diagrammatically shows another antenna structure in which a frustoconical radiator 1' is mechanically rotated. This rotary movement has the advantage of not causing amplitude modulation, which would then be parasitic insofar as the diagram of the source has circular symmetry, i.e. a characteristic surface of revolution.

Source 1 is a bimodal or corrugated circular horn, whose axis is parallel to axis z, energized by a crank-shaped circular guide 3, whose elbows 10 and 100 are so corrected as not to distort the transmitted polarization, and by a circular fixed guide 6 connected to guide 3 by a rotary coupler 50. A gear 90 again driven by a motor $M_1$ rotates the source 1 whose point C is the phase center of the transmitted wavefronts.

FIG. 4 diagrammatically illustrates an embodiment of the invention in which the antenna has a focusing reflector 11 centered on the axis T'T which corresponds to the axis z of FIG. 1 and on which lies the reflector apex S. This reflector has a focus F which coincides with the phase center of a primary source 12 inclined to the axis T'T in such a way that the direction of its maximum radiation $\vec{FS'}$ includes an angle $\theta'_1$ therewith. Other parameters partly illustrated in FIG. 4 are the vertex half-angle $\theta'_o$ of the antenna, the useful diameter D and the angles $\theta'$ and $\phi'$ which are the spherical coordinates of a primary direction again indicated by a vector $\vec{u}$. It is assumed that source 12 radiates in accordance with an approximately symmetrical and equiphase primary diagram $f(\theta',\phi')$. Again, the conical scan of this antenna generates a signal modulated only in phase.

Let us now consider the illumination law of the equivalent aperture in plane SFS' where angle $\phi_1 = 2\pi Nt$ (cf. FIG. 1), is again variable with time t. This illumination law is the product of the primary diagram of source 12 times the transfer function of the system. For a point M' of the equivalent aperture in plane P, having polar coordinates r, $\phi'$, the field in this point is given by $$E_x(M') = E_o A \cdot f(\theta',\phi') \cdot T_f(r) \qquad (7)$$

wherein $E_o$ and A are constant coefficients.

If the transfer function $T_f(r) = 1$ and the focal length of the reflector 11 is $L_f$, we can write $$r = 2L_f \sin\theta'/2 \approx L_f \theta' \qquad (8)$$

and $$E_x(r,\phi') \approx E_o A \cdot L_f(r/L_f,\phi') \qquad (9)$$

Thus, an equiphase and symmetrical illumination is obtained which is centered about the point $c_1$ of the aperture having the following coordinates $$r_1 = 2L_f \sin \theta'_1/2 \approx L_f \theta'_1 \qquad (10a)$$

$$\phi_1 = 2\pi N t \qquad (10b)$$

The point $C_1$ is the phase center of the secondary diagram, i.e. waves transmitted in space, this phase center rotating about the axis T'T.

On applying the theorem of translation (2), the diagram $f_1(u)$ at infinity is deduced from the corresponding diagram $f_o$, obtained when point $C_1$ coincides with the coordinate center F, by multiplying $\vec{f_o}$ by the phase factor $e^{ik\vec{FC_1}\cdot\vec{u}}$ where $k=2\pi/\lambda$ in the wave number already referred to.

By using the spherical coordinates $\theta',\phi'$ of the direction of the unit vector $\vec{u}$ we obtain $$\vec{f_1}(\theta',\phi') = \vec{f_o}(\theta',\phi')e^{ikL_f\theta'_1 \sin\theta' \cos(2\pi Nt - \phi')} \qquad (11)$$

Thus, a sinusoidally phase-modulated signal is obtained whose modulation depth is of the form $$\psi_{max} = p \cdot \sin \theta' \qquad (12)$$

corresponding to the previously established expression (6).

Again, angular tracking is achieved by demodulating a phase-modulated signal. The amplitude $p \cdot \sin \theta'$ and the phase $\phi'$ of this modulation give the spherical coordinates $\theta'$ and $\phi'$ of the target. It should be noted that the modulation can be high in the acquisition phase of a target but is low in the tracking phase.

FIG. 5 represents another antenna according to the invention including a reflector, as in the embodiment of FIG. 4.

The parabolic reflector 11 and its focus F on axis z coincides again with the phase center of a primary source 12, indicated diagrammatically as being in the form of a corrugated or bimodal Huygens horn. This horn is inclined relative to axis z by the above-discussed angle $\theta'_1$ and is rotated about point F by an electric motor which is not shown in this Figure. Energization of this source is effected by way of a bent circular guide 3, a rotary coupler 5, a waveguide joint 4, an elbow 10 and a rectangular guide 13, the latter being connected to a generator not shown.

FIG. 6 shows another embodiment of a conically scanning antenna, here of the Cassegrain type, with phase modulation according to my invention. In order to eliminate the rotary coupler used in FIG. 5 and to limit the size and weight of the moving parts, a fixed axial primary source 17 is used which radiates through a revolving prism made from natural or artificial dielectric material. A focusing system 25 includes a concave main reflector 14 and a convex auxiliary reflector 15, supported by arms 16 and 160, revolving about axis z. Radiator 17 disposed in the central part of the main reflector 14 is a circular corrugated horn connected to a nonillustrated power source by means of a smooth guide 18 and a junction 19.

A prism 21 is arranged in front of the aperture of the horn 17 and is rotated about axis z. With the primary source fixed, this prism serves to rotate the phase center of the waves transmitted by the horn in a plane parallel to the aperture of the antenna in order to create conical scanning with phase modulation. The prism can be rotated about axis z by surrounding it with a crown gear 22 which meshes with a gear 23 driven by a motor 24. The drawing shows the course of a beam corresponding to the direction of the radiation maximum. The phase center $C'_1$ of the waves transmitted by the system is displaced in the aperture plane of focusing system 25.

It should be noted that the placing of a prism in front of the horn mouth creates the danger of causing a parasitic amplitude modulation by shifting the phase center of the source away from the axis of rotation z. To obviate this disadvantage, a focusing lens 26 is positioned in the primary source 17 and restores the phase center to axis z. The primary source 17 could also be a multimode horn.

In the conical-scanning system described hereinbefore it is possible to establish a relationship between the gain loss and the slope due to the off-centering of the illumination with respect to the useful aperture of the system. This gain loss is proportional to the square of the primary offset $\theta'_1$ and can be calculated. The result of this calculation indicates that for a given angular-deviation slope p the required axial-gain reduction is smaller with the conical phase scanning according to my invention than with the conical amplitude scanning of the prior art. With phase scanning, unlike amplitude scanning, the maximum gain is obtained along the axis.

Reference will now be made in connection with FIG. 7 to the processing of the signal supplied by the antenna for the purpose of determining the offset of the target relative to the antenna, for example by its spherical coordinates.

On starting with equation (4) or (11) it can be seen that the antenna, taking account of the Doppler effect, has a phase factor $\psi_D$ conforming to the following expression:

$$\psi_D(t) = 2\pi f_D t + \psi(t) = 2\pi f_D t + \psi_o + p \sin\theta \cos(2\pi Nt - \phi)$$

where $\theta$ and $\phi$ are the two desired spherical coordinates,
N is again the scanning frequency,
p is, as before, the angular-deviation slope,
$\psi_o$ is an unknown origin phase,
$f_D$ is the Doppler frequency of the target.

Parameter $\psi_D$ contains a useful amplitude term $p \cdot \sin \theta$ and a parasitic term $2\pi f_D t$ for the angular-deviation measurement, the latter being a function of the Doppler frequency and having a very high amplitude. Processing consists in obtaining an estimated value of $f_D$ and subtracting $2\pi f_D t$ from $\psi_D(t)$.

The processing device shown in FIG. 7, associated with the antenna structure of FIG. 6, comprises a mixer 27 with inputs connected to guide 18 and to a local stabilizer oscillator 28 and with an output connected to an intermediate-frequency amplifier 29. The latter works into a coherent demodulator 30 also connected to the local oscillator 28. The two outputs of the coherent demodulator 30 are connected to a multiplication circuit 31, on the one hand via a so-called estimation circuit 32 for the Doppler frequency $f_D$ and on the other via a delay circuit 33.

A scan demodulator 34 supplying the spherical coordinates of a target is connected to the multiplier 31, by way of an arctan calculator 35, and to a circuit 36 which supplies a scanning reference and has an input connected to the rotary prism 21.

The calculation of the estimated value of the Doppler frequency $f_D$ is carried out in circuit 30 on the basis of signal components $\cos \phi_D$ and $\sin \phi_D$ from the coherent demodulator 30, the estimated value $f_D$ being fed to mulitplier 31 together with the components $\cos \psi_D$ and $\sin \psi_D$ delayed in circuit 33 which takes account of the response time of the estimator.

The outputs of multiplier 31 carry signals $\cos \psi(t)$ and $\sin \psi(t)$, with $\psi(t) = p \cdot \sin \theta \cos (2\pi Nt - \phi)$.

An arctan calculation in circuit 35 then determines the angle $\psi(t)$, whose indeterminacy within $2\pi$ does not matter since $p \cdot \sin \theta$ remains less than $\pi$.

The product of the angular value $\psi(t)$, emitted by the arithmetic means 31, 35, times the reference scanning signal from circuit 36 gives two signals proportional to $\theta \cos \phi$ and $\theta \sin \phi$, emitted by demodulator 34, which are representative of the angular deviations in elevation and in azimuth of the tracked target.

I claim:

1. A conically scanning radar antenna comprising:
a source of electromagnetic waves;
wave-reflecting means centered on an axis for converting waves emitted by said source into a beam of phase-modulated radiation substantially parallel to the axis, said source having a phase center located on said axis and a direction of maximum radiation inclined at an acute angle to said axis, said phase center substantially coinciding with a focal point of said wave-reflecting means;
drive means coupled with said source for rotating said direction of maximum radiation about said axis as a generatrix of a cone having a vertex substantially coincident with said phase center; and
circuit means connected to said source for extracting azimuthal and elevational data relative to a beam-illuminated target from reflected waves intercepted by said well-reflecting means and directed back to said source, said circuit means including a generator of reference scanning signals coupled with said drive means.

2. A radar as defined in claim 1 wherein said wave-reflecting means comprises a parabolic reflector with a fosus on said axis, said phase center coinciding with said focus.

3. A radar as defined in claim 2 wherein said source is a bimodal Huygens horn.

4. A radar as defined in claim 1 wherein said source comprises a horn centered on said axis and a prism closely juxtaposed with said horn, said drive means being coupled with said prism, said horn having a mouth provided with a focusing lens confronting said prism.

5. A conically scanning radar antenna comprising:
a source of electromagnetic waves;
wave-reflecting means centered on an axis for converting waves emitted by said source into a beam of phase-modulated radiation substantially parallel to said axis, said source including a horn centered on said axis and a prism closely juxtaposed with said horn for establishing a direction of maximum radiation inclined at an acute angle to said axis;
drive means coupled with said prism for rotating said direction of maximum radiation about said axis as a generatrix of a cone having a vertex substantially coinciding with a focal point of said wave-reflecting means; and
circuit means connected to said source for extracting azimuthal and elevational data relative to a beam-illuminated target from reflected waves intercepted by said wave-reflecting means and directed back to said source.

6. A radar as defined in claim 1 wherein said horn has a mouth provided with a focusing lens confronting said prism for providing said source with a phase center substantially coincident with said vertex.

7. A radar as defined in claim 4, 5 wherein said wave-reflecting means comprises a convex auxiliary reflector facing said prism and a concave main reflector facing said auxiliary reflector.

8. A radar as defined in claim 5 wherein said circuit means includes a generator of reference scanning signals coupled with said drive means.

9. A radar as defined in claim 1 or 8 wherein said circuit means further comprises a coherent demodulator deriving sine and cosine functions from said reflected waves, a Doppler-frequency estimator connected to said demodulator, arithmetic means connected to said demodulator and to said estimator for multiplying an output signal of the latter with said sine and cosine functions and deriving an angular value from the resulting multiplication products, and demodulating means connected to said arithmetic means and to said generator for multiplying said scanning signals with said angular value.

* * * * *